(12) United States Patent
Fourney

(10) Patent No.: US 11,952,220 B2
(45) Date of Patent: Apr. 9, 2024

(54) CONVEYOR DISCHARGE WITH DIVERTING ROLLERS

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 240 days.

(21) Appl. No.: 17/603,076

(22) PCT Filed: Apr. 28, 2020

(86) PCT No.: PCT/US2020/030189
§ 371 (c)(1),
(2) Date: Oct. 12, 2021

(87) PCT Pub. No.: WO2020/223188
PCT Pub. Date: Nov. 5, 2020

(65) Prior Publication Data
US 2022/0185596 A1 Jun. 16, 2022

Related U.S. Application Data

(60) Provisional application No. 62/840,223, filed on Apr. 29, 2019.

(51) Int. Cl.
*B65G 47/46* (2006.01)
*B65G 11/20* (2006.01)
*B65G 13/10* (2006.01)
*B65G 47/82* (2006.01)

(52) U.S. Cl.
CPC ............ *B65G 47/46* (2013.01); *B65G 11/203* (2013.01); *B65G 13/10* (2013.01); *B65G 47/82* (2013.01)

(58) Field of Classification Search
None
See application file for complete search history.

(56) References Cited

U.S. PATENT DOCUMENTS

| | | | |
|---|---|---|---|
| 3,272,298 A | 9/1966 | Cato | |
| 4,598,815 A * | 7/1986 | Adama | B65G 47/54 198/782 |

(Continued)

FOREIGN PATENT DOCUMENTS

| | | |
|---|---|---|
| CN | 1138002 A | 12/1996 |
| CN | 104307758 A | 1/2015 |

(Continued)

OTHER PUBLICATIONS

Extended European Search Report of European Patent Application No. 20799118.3, dated Dec. 14, 2022, European Patent Office, Munich, Germany.

*Primary Examiner* — William R Harp
(74) *Attorney, Agent, or Firm* — James T. Cronvich

(57) ABSTRACT

A sorting system having a main sorting conveyor sorting articles to discharge conveyors feeding articles to diverters having freely rotatable, gravity-activated rollers arranged in an inclined plane. The orientations of the rollers are selectably changed to divert articles riding downward along each diverter to different destinations. The main sorting conveyor comprises a roller belt with belt-roller actuators at sorting locations. The belt-roller actuators and the diverters are identical mechanisms.

10 Claims, 3 Drawing Sheets

(56) References Cited

U.S. PATENT DOCUMENTS

| | | | |
|---|---|---|---|
| 7,040,478 B2 * | 5/2006 | Ehlert | B65G 13/10 |
| | | | 198/370.09 |
| 7,461,739 B2 * | 12/2008 | Fourney | B65G 17/24 |
| | | | 198/782 |
| 7,506,751 B2 | 3/2009 | Fourney | |
| 9,079,717 B1 * | 7/2015 | Costanzo | B65G 13/04 |
| 9,248,981 B1 | 2/2016 | Skoretz et al. | |
| 2017/0121124 A1 | 5/2017 | Wilkins | |
| 2018/0127213 A1 | 5/2018 | Wargo et al. | |
| 2019/0060959 A1 | 2/2019 | Imazuka et al. | |

FOREIGN PATENT DOCUMENTS

| | | |
|---|---|---|
| JP | 2001-315928 A | 11/2001 |
| KR | 10-2019-0012431 A | 2/2019 |

\* cited by examiner

CONVEYOR DISCHARGE WITH DIVERTING ROLLERS

BACKGROUND

The invention relates generally to power-driven conveyors and more particularly to conveyors with selectively oriented gravity rollers.

In various industries, such as package-handling, sorting conveyors are used to sort packages off one or both sides onto discharge conveyors such as chutes or slides. Each discharge conveyor deposits its packages into a collection bin, which must be replaced or emptied when full. If a bin is not emptied when full, packages destined for the bin fall onto the floor.

SUMMARY

One version of a conveyor system embodying features of the invention comprises a main conveyor conveying articles in a main conveying direction and a plurality of first discharge conveyors. A sorting system selectably sorts articles off the main conveyor onto the first discharge conveyors. A diverter on each of the first discharge conveyors includes an array of freely rotatable rollers angling downward on an inclined plane from an upper end to a lower end and a drive system coupled to the rollers that includes an actuator operable to selectably change the orientation of the rollers in the inclined plane to direct articles riding downward along the diverter atop the rollers to different destinations over the lower end.

One version of a diverter embodying features of the invention comprises an array of freely rotatable rollers angling downward on an inclined plane from an upper end to a lower end and a drive system coupled to the rollers and including an actuator operable to selectably change the orientation of the freely rotatable rollers in the inclined plane to direct articles riding downward along the diverter by gravity atop the freely rotatable rollers to different destinations over the lower end.

DETAILED DESCRIPTION

Figure 1:
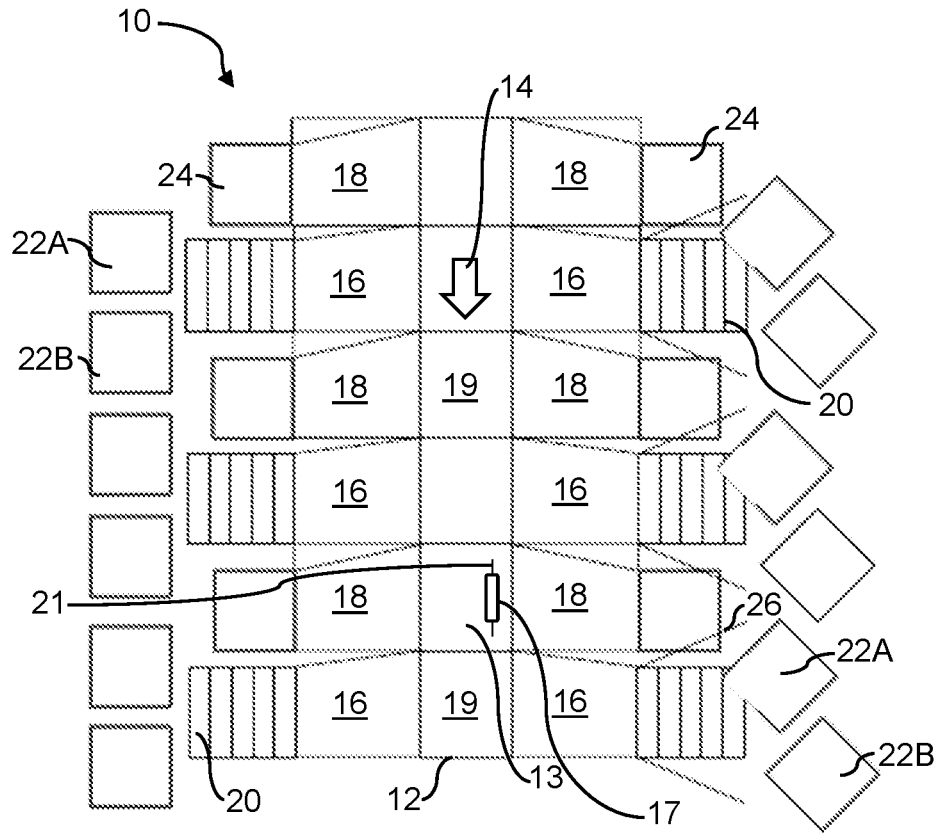
FIG. 1 is a top plan view of a schematic drawing of a conveyor system embodying features of the invention.
Figure 2:
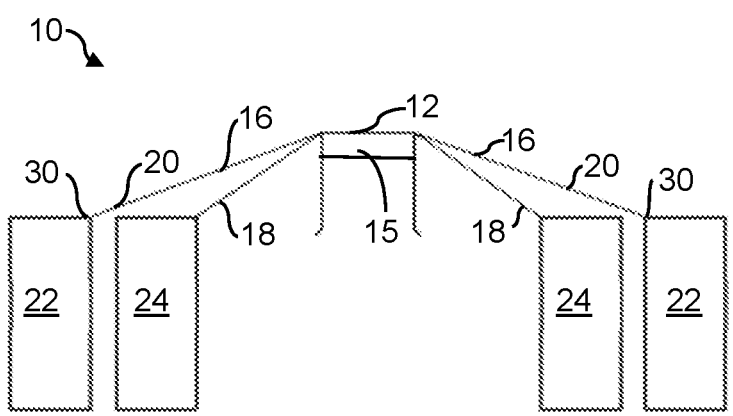
FIG. 2 is a front elevation view of the conveyor system of FIG. 1.

Schematic views of a conveyor system embodying features of the invention are shown in FIGS. 1 and 2. The conveyor system 10 includes a power-driven main conveyor 12 conveying articles in a main conveying direction 14. The main conveyor 12, which may be a belt conveyor, a tray conveyor, a slat conveyor, or a powered-roller conveyor, is flanked on both sides by discharge conveyors 16, 18. One example of a main conveyor is the Intralox® ARB Sorter S7000 sorting conveyor manufactured and sold by Intralox, L.L.C., Harahan, Louisiana, U.S.A. A sorting system composed of sorting diverters 19 at the entrance to each discharge conveyor 16, 18 selectively sorts articles off the sides of the main conveyor 12 transverse to the main conveying direction 14 and onto a discharge conveyor or allows articles to pass through to downstream sorting diverters. In this version each of the discharge conveyors 16 includes a diverter 20. The diverter 20 selectively diverts articles to one or the other of its collection bins 22: 22A, 22B. If an odd number of collection bins associated with a common destination are used, other discharge conveyors 18 without diverters can be used to deliver direct articles directly into single collection bins 24. If necessary, walls 26 on opposite sides of the diverters 20 can be used to prevent diverted articles from missing the selected bins 24.

As shown in FIG. 2, each discharge conveyor 16, 18 may be angled downward on a decline toward the collection bins 22, 24. If angled as shown, the discharge conveyor 16, 18 may include a slide or chute along which articles advance by gravity. But the discharge conveyors could include powered conveyors that are horizontal. The diverter 20 at the exit end of each discharge conveyor 16 is angled downward. Its upper end 28 receives articles sorted onto the discharge conveyor 16 from the main conveyor 12. The articles, under the influence of gravity, roll down the declining diverter 20 and off its lower end 30 and into a collection bin 22.

Figure 3:
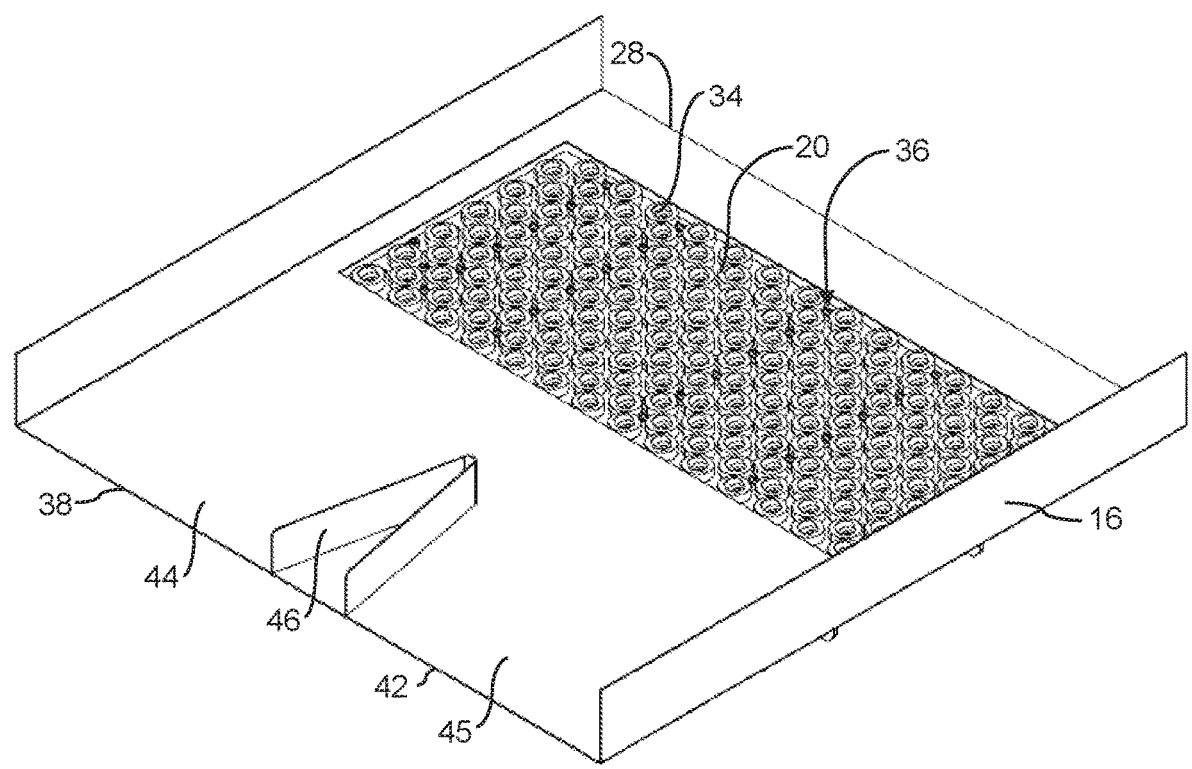
FIG. 3 is an isometric view of a gravity-roller diverter in a discharge conveyor in a conveyor system as in FIG. 1.
Figure 4A:
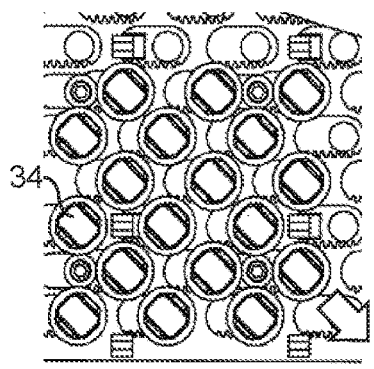
FIGS. 4A and 4B are plan views of portions of a diverter as in FIG. 3 showing the rollers in two different orientations.
Figure 4B:
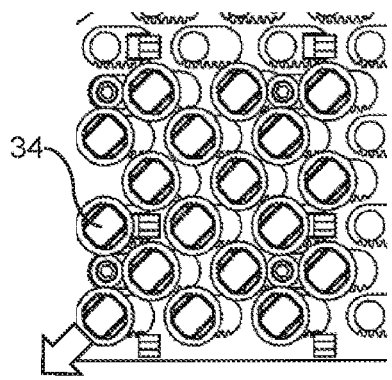

Details of the diverter 20 in a discharge conveyor 16a slide in this example are shown in FIG. 3. The diverter 20 includes an array of freely rotatable rollers 34 mounted in a cutout or opening 36 in an outer surface 38 of the slide. The slide declines from its upper end 28 to a lower end 42. The tops of the rollers 34 are coplanar with the outer surface 38 of the slide. The orientation of the rollers 34 is selectably adjustable to direct articles riding down the diverter atop the rollers by gravity to the left side 44 or the right side 45 of the slide. A divider 46 at the lower end 42 of the slide helps funnel the articles to the selected side. Because the freely rotatable rollers 34 are arranged on an inclined plane, they act as gravity rollers atop which articles ride down the diverter 20 in the direction of rotation of the rollers. FIGS. 4A and 4B show the diverting rollers 34 oriented in two different directions on their axles. The rollers 34 are shown oriented to direct articles toward the left side in FIG. 4B and to the right side in FIG. 4A. It would also be possible to orient the rollers in more than the two directions shown to direct articles to more than two collection bins.

Figure 5:
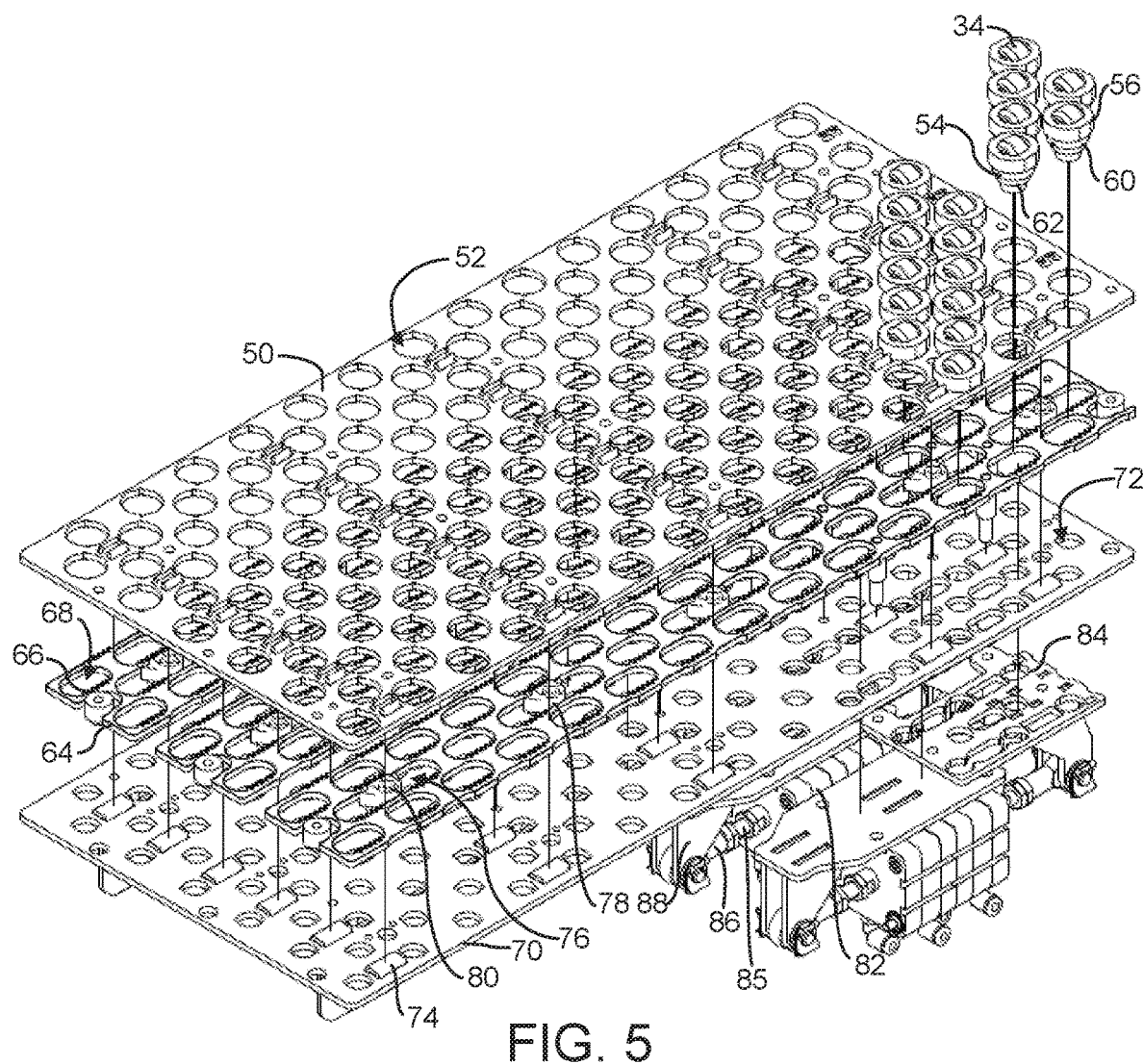
FIG. 5 is an exploded top isometric view of the diverter of FIG. 3.

An exploded view of the diverter 20 is shown in FIG. 5. The diverter to be described was originally designed for use as a belt-roller activation system as described in detail in U.S. Pat. No. 9,079,717, "Conveyor Systems for Diverting Objects," issued Jul. 14, 2015, and incorporated into this application by reference. The belt-roller activation system described in U.S. Pat. No. 9,079,717 includes belt-roller actuators, each having an array of drive rollers that lie in a horizontal plane below a roller belt whose belt rollers are rotatable on axes parallel to the direction of belt travel. The orientation of all the drive rollers can be selectably changed in unison from one oblique direction to another to cause the belt rollers they contact as the belt advances along an upper carryway in a conveying direction to rotate in a first transverse direction or an opposite second transverse direction to sort articles off one side of the belt or the other. Such a roller belt 13 and belt-roller actuators 15 actuating belt rollers 17 rotatable on axes 21 parallel to the main conveying direction 14 can be used as the main conveyor 12 and the sorting diverters 19 of FIGS. 1 and 2. And, because of their structural similarity, the belt-roller actuators 15 can be used as the diverters 20 in the discharge conveyors 16. Benefits of using the same mechanisms for the slide diverters and for the belt-roller actuators include consistency and fewer spare parts to be stocked. But, unlike the drive rollers in the belt-roller actuators, the rollers 34 in the diverter 20 in the discharge conveyors 16 are used not to contact belt rollers, but to contact the undersides of articles advancing by gravity down the discharge conveyors and direct them in one direction or the other.

As shown in FIG. 5, a pan 50 is mounted in a conveyor frame (not shown). The pan 50 is perforated with a plurality of circular openings 52 arranged in longitudinal columns and lateral rows. Each opening 52 pivotably receives a cartridge 54 supporting a freely rotatable roller 34.

The roller cartridge 54 includes a retainer ring 56 with diametrically opposite holes 58 supporting the ends of an axle received in a bore in the roller 34. The roller 34 is retained in the cartridge 54 along a fixed axis with a salient portion of the roller protruding beyond the top of the retainer ring 56. A cartridge gear 60 is disposed on a lower stem 62 of the cartridge 54. The cartridge gear is shown as a spur gear with peripheral teeth.

The cartridges 54 are received in the openings 52 in the pan 50. The walls of the openings form bearing surfaces against which the cartridges rotate. Because the diameter of the retainer rings exceeds the diameter of the openings, the ring shoulders rest atop the carryway pan with the gear portions suspended below.

A gear plate 64 is movably positioned below the pan 50. Actuator gears in the form of rack gears 66 are disposed on the gear plate 64. Each rack gear 66 is positioned to engage the teeth of one of the cartridge gears 60 to form a rack-and-pinion system that can pivot the cartridges in unison as the gear plate 64 is translated. The gear plate 64 has elongated openings 68 bounded on one side by a linear array of teeth forming a rack gear 66. Each elongated opening 68 is positioned below one of the openings 52 in the carryway pan. The lower journal stem 62 extends through the elongated openings 68 in the gear plate 64, which is sandwiched between two other plates: the pan 50 and a bottom plate 70. The bottom plate 70, which is stationarily affixed to a portion of the conveyor frame has a plurality of openings 72 vertically aligned with, but having a smaller diameter than, the openings in the carryway pan. The openings 72 are sized to rotatably receive the lower journal stems 62 of the cartridges. This helps align the upper pan and the bottom plate to facilitate assembly of the roller drive mechanism and also confines the rotatable cartridges in rotation on fixed axes perpendicular to the plane of the pan 50.

Confronting spacer pads 74 on the top of the bottom plate 70 and on the bottom of the pan 50 meet to maintain the proper spacing between the two plates to accommodate the movable gear plate 64. Some of the elongated openings 76 in the gear plate 64 are joined by intermediate slots 78. Rollers 80 in the slot portions are rotationally mounted on pins extending downward from the bottom of the pan 50. The distal ends of the pins are received in sockets in the bottom plate. The rollers 80 bear on the sides of the slots as the gear plate 64 is translated relative to the top and bottom plates.

The gear plate 64 is translated by a linear actuator 82, such as an air cylinder, controlled by a controller (not shown). One end of the actuator is attached to a mounting bracket 84 suspended from the bottom of the top plate, or carryway pan 50, by a clevis and tie rod. The extension of an extension rod 85 from the other end of the actuator is selectable. The distal end of the extension rod is connected by a clevis and tie rod 86 to a pivot bracket 88 suspended from the bottom of the gear plate 50. The extension rod translates the gear plate. The rod's extension determines the position of the gear plate and the orientation of the rollers 34. The actuator 82, the gear plate 64, the actuator gears 66, and the cartridge gears 60 form part of a drive system that changes the orientation of the rollers 34 in unison.

Figure 6:
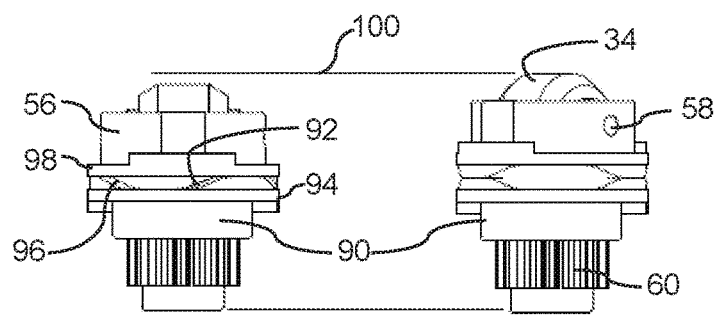
FIG. 6 is a side elevation view of a roller cartridge usable in a diverter as in FIG. 5 shown in lowered and raised positions.

The tops of the rollers 34 in FIG. 5 remain in the same inclined plane regardless of their orientation. A different kind of roller cartridge 90 is shown in FIG. 6. In that cartridge, the level of the tops of the rollers 34 changes with orientation angle. An upwardly facing cam surface 92 on the top face of a lower ring portion 94 of the cartridge 90 coacts with a downwardly facing cam surface 96 on a bottom face of an upper ring portion 98. Both cam surfaces 92, 96 are lobed so that they form a cam that raises and lowers the level 100 of the rollers 34 as they are pivoted to change their orientation. When the diverter's actuator orients the rollers 34 in their opposite diverting positions as in FIGS. 4A and 4B, the rollers are raised so that their tops are at the level of the outer surface of the slide. When transitioning between the two diverting positions, the tops of the rollers 34 are recessed below the level of the outer surface of the slide.

What is claimed is:

1. A conveyor system comprising:
   a main conveyor having a first side and a second side and conveying articles in a main conveying direction;
   a plurality of first discharge conveyors along the first and second sides of the main conveyor;
   a sorting system selectably sorting articles off the main conveyor onto the first discharge conveyors;
   wherein the main conveyor comprises a roller belt having belt rollers rotatable on axes parallel to the main conveying direction on an upper carryway and wherein the sorting system comprises a belt-roller activation system below the roller belt on the upper carryway selectably contacting the belt rollers to cause them to rotate toward the first discharge conveyors to sort articles off the main conveyor and onto the first discharge conveyors;
   wherein the belt-roller activation system includes a plurality of first arrays of freely rotatable rollers and a first drive system coupled to the first arrays of freely rotatable rollers and including first actuators operable to selectably change the orientations of the first arrays of freely rotatable rollers between a first orientation that causes the belt rollers in contact to rotate in a first direction pushing articles atop the belt rollers to the first discharge conveyors at the first side of the main conveyor and a second orientation that causes the belt rollers in contact to rotate in an opposite second direction pushing articles atop the belt rollers to the first discharge conveyors at the second side of the main conveyor;
   a diverter on each of the first discharge conveyors, the diverter including:
      a second such array of freely rotatable rollers angling downward on an inclined plane from an upper end to a lower end;
      a second such drive system coupled to the second array of freely rotatable rollers and including a second actuator operable to selectably change the orientation of the second array of freely rotatable rollers in the inclined plane to direct articles riding downward along the diverter directly atop the freely rotatable rollers to different destinations over the lower end.

2. A conveyor system as claimed in claim 1 wherein the first discharge conveyors include slides.

3. A conveyor system as claimed in claim 2 wherein the slides have an outer surface and wherein the tops of the freely rotatable rollers of the second such array are coplanar with the outer surface.

4. A conveyor system as claimed in claim 1 comprising a divider in the discharge conveyors beyond the lower end of the diverter to help funnel diverted articles to the selected destinations.

5. A conveyor system as claimed in claim 1 comprising second discharge conveyors disposed between consecutive first discharge conveyors, wherein each of the second discharge conveyors directs articles directly to a single destination.

6. A conveyor system comprising:
a main conveyor conveying articles in a main conveying direction and including a roller belt having belt rollers rotatable on axes parallel to the main conveying direction;
a plurality of first discharge conveyors including slides angling downward from an upper end to a lower end;
a belt-roller activation system including a plurality of first arrays of freely rotatable rollers and a drive system coupled to the first arrays of freely rotatable rollers and including first actuators operable to selectably change the orientations of the first arrays of freely rotatable rollers from a first orientation that causes the belt rollers in contact to rotate in a first direction to a second orientation that causes the belt rollers in contact to rotate in an opposite second direction;
a diverter on each of the slides of the first discharge conveyors, the diverter including:
a second array of freely rotatable rollers on the slides;
a drive system coupled to the second array of freely rotatable rollers and including a second actuator operable to selectably change the orientation of the freely rotatable rollers in the second array to direct articles riding downward along the diverter directly atop the freely rotatable rollers to different destinations over the lower end;
wherein the first and second arrays of freely rotatable rollers are similar mechanisms.

7. A conveyor system as claimed in claim 6 wherein each of the first and second arrays of freely rotatable rollers comprises:
roller cartridges arranged in rows and columns, each roller cartridge supporting one of the freely rotatable rollers and having a cartridge gear;
actuator gears engaged with the cartridge gears and actuated by one of the first actuators or one of the second actuators to rotate the roller cartridges and change the orientations of the freely rotatable rollers.

8. A conveyor system as claimed in claim 6 wherein the first discharge conveyors are disposed on both sides of the main conveyor.

9. A conveyor system comprising:
first and second arrays of freely rotatable rollers, each array actuatable to change the orientations of the freely rotatable rollers;
a main conveyor conveying articles in a main conveying direction and including a roller belt having two opposite sides and belt rollers rotatable on axes parallel to the main conveying direction;
discharge conveyors at discharge positions along the length of the main conveyor receiving articles over the sides of the main conveyor;
wherein the first arrays underlie the roller belt at the discharge positions are selectably actuated to orient their freely rotatable rollers in contact with the belt rollers to cause the belt rollers to rotate and divert articles atop the belt rollers to one of the discharge conveyors;
wherein each of the discharge conveyors includes an inclined portion in which one of the second arrays is mounted;
wherein articles diverted to the discharge conveyors ride directly atop the freely rotatable rollers in the second arrays and are diverted in one direction or another by the selectably actuated orientations of the freely rotatable rollers.

10. A conveyor system as claimed in claim 9 comprising first actuators first actuators operable to selectably change the orientations of each of the first arrays of freely rotatable rollers and second actuators operable to selectably change the orientations of each of the second arrays of freely rotatable rollers wherein each of the first and second arrays of freely rotatable rollers comprises:
roller cartridges arranged in rows and columns, each roller cartridge supporting one of the freely rotatable rollers and having a cartridge gear;
actuator gears engaged with the cartridge gears and actuated by one of the first actuators or one of the second actuators to rotate the roller cartridges and change the orientations of the freely rotatable rollers.

* * * * *